United States Patent
Farivar et al.

(10) Patent No.: US 11,301,861 B2
(45) Date of Patent: Apr. 12, 2022

(54) SYSTEM AND METHOD FOR MODIFYING PAYMENT PROCESSING TIMES UPON SUSPICION OF FRAUD

(71) Applicant: Capital One Services, LLC, McLean, VA (US)

(72) Inventors: Reza Farivar, Champaign, IL (US); Vincent Pham, Champaign, IL (US); Anh Truong, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/075,873

(22) Filed: Oct. 21, 2020

(65) Prior Publication Data

US 2021/0241280 A1 Aug. 5, 2021

Related U.S. Application Data (63) Continuation of application No. 16/782,264, filed on Feb. 5, 2020, now Pat. No. 10,846,702.

(51) Int. Cl.
G06Q 20/40 (2012.01)
G06Q 50/26 (2012.01)
G06Q 20/34 (2012.01)
G06N 5/02 (2006.01)

(52) U.S. Cl.
CPC ........... *G06Q 20/4016* (2013.01); *G06N 5/02* (2013.01); *G06Q 20/34* (2013.01); *G06Q 50/26* (2013.01)

(58) Field of Classification Search
CPC ................................................ G06Q 20/4016
See application file for complete search history.

(56) References Cited

U.S. PATENT DOCUMENTS

| | | | |
|---|---|---|---|
| 7,543,739 B2 | 6/2009 | Brown et al. | |
| 10,339,608 B1 | 7/2019 | Haitz et al. | |
| 2008/0040275 A1* | 2/2008 | Paulsen | G06Q 40/00 705/44 |
| 2014/0215626 A1 | 7/2014 | Pam et al. | |
| 2014/0310160 A1 | 10/2014 | Kumar et al. | |
| 2014/0372743 A1* | 12/2014 | Rogers | H04W 12/126 713/2 |
| 2015/0348042 A1* | 12/2015 | Jivraj | G06Q 20/322 705/44 |

(Continued)

FOREIGN PATENT DOCUMENTS

| | | | | |
|---|---|---|---|---|
| AU | 2010276361 A1 * | 2/2012 | | G07F 7/08 |
| CA | 2367462 A1 | 9/2000 | | |
| WO | WO-2009048843 A1 * | 4/2009 | | G06Q 10/10 |

*Primary Examiner* — Scott C Anderson
(74) *Attorney, Agent, or Firm* — Walter Haverfield LLP; James J. Pingor (57) ABSTRACT

Systems, methods, and computer-readable storage media for monitoring risk levels in continuing to allow a potentially compromised payment card to continue to be used. An exemplary system can include a processor which receives a notification of unauthorized use of a card, retrieves a transaction history of authorized use of the card, and performs predictive modeling based on the transaction history based to determine a predicted transaction amount for future transactions. The system can then determine a risk level of continued use of the card and modify processing of the ongoing transaction based on the risk level. The system can then issue a risk level notification to proper authorities.

20 Claims, 5 Drawing Sheets

(56) References Cited

U.S. PATENT DOCUMENTS

| | | |
|---|---|---|
| 2018/0232534 A1* | 8/2018 | Dotan-Cohen ..... H04W 12/033 |
| 2018/0255080 A1 | 9/2018 | Paine |
| 2018/0300557 A1* | 10/2018 | Rodenas ................ G11B 27/10 |
| 2019/0207953 A1 | 7/2019 | Klawe et al. |
| 2019/0295119 A1 | 9/2019 | Basu et al. |
| 2020/0027092 A1 | 1/2020 | Mossoba et al. |
| 2020/0065813 A1* | 2/2020 | Walters ................ G06N 3/0472 |

\* cited by examiner

SYSTEM AND METHOD FOR MODIFYING PAYMENT PROCESSING TIMES UPON SUSPICION OF FRAUD

CROSS-REFERENCE TO RELATED APPLICATIONS

This application is a continuation of, and claims priority to, U.S. patent application Ser. No. 16/782,264, filed Feb. 5, 2020, which is incorporated herein in its entirety by reference.

BACKGROUND

1. Technical Field

The present disclosure relates to payment card fraud, and more specifically to monitoring payment transactions for fraud and modifying processing times when fraud is suspected.

2. Introduction

Payment cards, such as credit cards, debit cards, and gift cards, have become a common payment mechanism. Payment card processing systems rely on identification information printed on the surface, embedded within magnetic strips on the surface of a card, or contained within chips integrated into the card. Processing a payment card requires a receiving device which receives either the credit card number printed on the surface of the card, the magnetic strip of the card, or the card's chip. If the receiving device uses the magnetic strip of the card's chip, the device extracts the identification information, then sends that identification information as an electronic signal to a payment card processing system together with a required payment request.

Stolen or lost payment cards, such as credit and debit cards, are a major source of fraudulent transactions. Generally users or the banking institution supporting the payment card identify potential fraud, then cancel the card and reimburse the user's account for any losses. However, because of this cancellation policy, the thief using the card is rarely apprehended due to the inability of law enforcement to be near the thief during a transaction.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media a technical solution to the technical problem described. A system configured to perform the concepts disclosed herein can include: a processor; and a non-transitory computer-readable storage device having instructions stored thereon which, when executed by the processor, cause the processor to: receive a notification of unauthorized use of a card; store the notification in a database, the notification being associated with a card number and an account number of the card; receive transaction information for an ongoing transaction associated with the account number; initiate monitoring of the ongoing transaction associated with the account number, based on receipt of the notification; retrieve, from the database, a transaction history of authorized use of the card; analyze the transaction history to determine a benchmark parameter of the transaction history; perform predictive modeling based on the transaction history based to determine a predicted transaction amount for future transactions; analyze the predicted transaction amount to determine a risk level of continued use of the card; modify processing of the ongoing transaction associated with the account number based on the risk level; analyze ongoing transactions of the card to determine a transaction parameter of the ongoing transaction of the card; compare the transaction parameter of an amount of the ongoing transaction with the transaction parameter of the transaction history to determine a comparison result; and issue a risk level notification based on the comparison result.

A method for performing the concepts disclosed herein can include: identifying, by a processor, a suspicious transaction of a payment card; initiating, via the processor, increased monitoring of the transactions of the payment card upon identifying the suspicious transaction; while performing the increased monitoring of the transactions of the payment card: performing predictive modeling, by the processor based on the suspicious transaction, of future fraud, resulting in a future fraud calculation; determining, via the processor based on stored suspicious transactions, a likelihood of thief apprehension; and generating, via the processor based on the future fraud calculation and the likelihood of thief apprehension, a risk potential of not immediately cancelling the payment card, until the likelihood of thief apprehension meets or exceeds a predetermined apprehension level; and issuing a notification to law enforcement upon the likelihood of thief apprehension meeting or exceeding the predetermined apprehension level.

Another exemplary system configured to perform the concepts disclosed herein can include: a database storing transactions, the transactions being associated with a card, the card corresponding to an account number; at least one fraud detection server configured to: detect compromise of the card; and issue a fraud message when unauthorized use is detected, indicating an ongoing transaction; and at least one fraud monitoring server configured to: receive the fraud message; instantiate monitoring transactions associated with the card occurring after receipt of the fraud message; store the transactions associated with the card occurring after receipt of the fraud message in the database; perform predictive modeling on transactions associated with the card occurring after receipt of the fraud message to predict future transaction parameters; analyze the future transaction parameters to determine a risk level of continued use of the card; modify processing of the ongoing transaction associated with the account number based on the risk level; retrieve, from the database, a transaction history of authorized use of the card, analyze the transaction history to determine a benchmark parameter of the transaction history; compare the transaction parameter of an ongoing transaction amount with the transaction parameter of the transaction history to determine a comparison result; and issue a risk level notification for the ongoing transaction based on the comparison result.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

Systems configured as disclosed herein can include back-end servers and computing systems which process the transactions to, upon identifying a likely instance of fraud or theft of a payment card, determine what the likely harm will be if the thief continues to use the card. The likely harm, or the risk associated with allowing the thief to continue to use the card, can be calculated using predictive modeling, where the inputs to the predictive modeling can include, for example, the amounts of the fraudulent transactions, the type of card being misused, the frequency of transactions, etc. When the predicted risk is below a threshold, the system can continue to monitor the card and, upon detecting an opportunity to inform law enforcement regarding the thief, alter the processing time for an ongoing transaction to allow law enforcement to arrive. The model which assigns values (monetary or otherwise) to the choice of whether to continue the façade or to cancel the card can be a technical model. For example, the model can be a machine learning model trained from previous fraud samples that have been identified.

Consider the following example. A credit card, owned by an individual and maintained/monitored by a credit card company, is identified by the credit card company as likely having been stolen based on one or more possibly fraudulent transactions. Determining that a card has likely been lost or stolen, or that a transaction is likely fraudulent, can occur in a variety of ways. For example, the credit card company may determine that the amounts of the transactions are outside the common range of transactions of the card owner and are therefore suspicious. Likewise, the credit card company may identify that the items being purchased, the locations of the transactions, and/or other factors indicate that the credit card may be compromised.

Whereas previous systems would immediately cancel the credit card, systems configured according to this disclosure instead monitor the card for additional activity while simultaneously determining a level of risk in allowing the card to continue to be used. This allows for additional evidence to be gathered against the thief/fraudster and potentially allows for law enforcement to capture the wrongdoer. For example, if the thief appears to purchase coffee at the same location at approximately the same time everyday, the system can identify the pattern. The system can then monitor for a subsequent fraudulent transaction at that same location. When the thief goes to purchase coffee again, per their routine, the system can modify the transaction processing time of the card such that the processing time is slower than normal. At the same time, the system can inform law enforcement that the thief has an ongoing transaction at a known location, providing law enforcement time to arrive at the location and apprehend the thief.

Systems disclosed herein can use any known method or system for identifying suspicious or fraudulent transactions. For example, a suspicious transaction can be identified based on a comparison to previous transactions of an owner of the card on the basis of location where the transaction occurred, time of day, amount, etc. In some cases, the level of suspicion can be ranked. For example, a "high" level of suspicion or risk can be associated with a transaction more than three standard deviations from an average transaction amount for that card; a "medium" suspicion or risk can be associated with a transaction between one and three standard deviations from the average transaction amount; and a "low" suspicion or risk can be associated with a transaction less than one standard deviation from the average transaction amount. Similar rankings can be assigned based on time of day, location of the establishment, etc.

Once a suspicious transaction is identified, the system calculates a level of risk in continuing to allow the card to remain active. That is, the system calculates an estimated cost of allowing the fraud to continue while collecting additional evidence against the fraudster, and weighs that cost against the investigative value of allowing the card to remain active. The level of risk may also be based on the deviations from average amounts, as described above. The estimated cost of allowing the fraud to continue can include amounts to be reimbursed to the owner of the card, as well as costs associated with cancelling the card and issuing a replacement card. The investigative value can be determined, for example, based on how likely it is that the system will be able to discern a pattern of fraud if the fraudster continues making fraudulent transactions similar to those identified to date.

Both the estimated cost of allowing the fraud to continue and the investigative value of allowing the fraud to continue are iteratively updated each time a new fraudulent transaction is detected. For example, the estimated cost can be calculated used predictive modeling. The predictive model can, for example use as inputs: the transactions of the card identified as possibly fraudulent until the present moment; similar fraudulent transactions based on geographic location, time of day, time of year/season, transaction locations, etc. For example, if the system detects a first suspicious transaction at a gas station often associated with fraud, the system can, based on previous fraudulent transactions at that gas station, predict the subsequent fraudulent transactions likely to occur with that card. Likewise, if the system detects that a first transaction is at a farmer's market for a relatively low amount (e.g., less than $5) and a second transaction is for electronics at a substantially higher amount (e.g., more than $100), the predictive modeling can predict that the costs for allowing the fraud to continue are rapidly escalating. In this manner, the system can iteratively model the expected cost for continuing to allow the fraud to continue.

At the same time, with each fraudulent transaction the system can determine the investigative value of allowing the fraud to continue. Using the same examples as before, if fraudulent transactions at the gas station are generally repeated daily until the credit card is cancelled, the system can predict that the thief will maintain this pattern and can be apprehended. However, if fraudulent transactions at the farmer's market do not result in any common pattern which may be used by law enforcement to apprehend the thief, the investigative value of continuing to allow the fraud may be quite low.

The level of risk represents a balance between the cost of allowing fraudulent transactions to continue and the investigative value associated with those fraudulent transactions. In some configurations, the level of risk can be calculated as a weighted value. As a non-limiting example, the level of risk could be calculated as:

Risk level=(% likelihood of apprehension)×(cost of continued fraud)

In such a configuration, the system can then compare the calculated risk level to a predetermined "cut-off" or maximum amount, and automatically cancel the card or continue monitoring the card for additional fraud based on that comparison. If, for example, the likelihood of apprehension is 50%, and the projected cost of continued fraud is $100, the risk level (using the above example equation) would be 50. If the predetermined maximum risk level is 100, then in this example the system would allow the fraud to continue, thereby allowing additional evidence to be collected and additional patterns to be predicted. In other examples, the calculation of risk level may have other factors, and those factors may or may not be weighted in a linear fashion.

In another example, the system can use a machine learning model to predict the risk score based on collected features such as: the number of days having a repeated transaction, the gradient of transaction amount(s), transaction location (expensive, less expensive), if the transaction time is close to shopping season, etc. The system can then perform a linear regression on the collected data to obtain mean-squared-error loss on the data, which can be used to predict the risk score and/or train a neural network (which can, in turn, make risk predictions). This has an advantage in that it can capture non-linear relationships among the features instead of just linear relationships.

Exemplary transactions could be collected by the system as follows, where the five most recent transactions on a payment card show three instances of fraudulent use:

T1: Genuine user transaction for $150
T2: Genuine user transaction for $85
—card stolen—
T3: Fraudulent transaction for $240
T4: Fraudulent transaction for $11.20
T5: Fraudulent transaction for $875
—card is cancelled—

If the system has a variety of such sequences, the system can use those sequences to associate dollar (or other currency) values to the cost of allowing the thief to continue. Each transaction can have dates, times, locations, amounts, and/or other data associated with the transactions.

In some configurations, the level of risk and/or the predetermined maximum risk level can be based on the type of card being used, the amount of money in an account associated with a card, and/or the credit limit associated with a card. For example, if a debit card is suspected of being used in fraudulent transactions, and the account associated with the debit card has limited funds which, if the fraud continues, may place the card holder at risk of running out of funds (e.g., "bouncing"), the maximum risk level for that specific card holder may be significantly lower than for other card holders. Alternatively, if a gift card is suspected of being used in fraudulent transactions, the maximum risk level may be relatively high. In another example, a credit card with a credit limit of $5000 may have a substantially lower maximum risk level than that of a credit card with a credit limit of $100,000.

The predicted likelihood of apprehension can determine when law enforcement are made aware of the fraud. For example, once a pattern of suspected fraudulent transactions has been generated and the predicted likelihood of apprehension meets a minimum requirement, the system can transmit a notification to law enforcement regarding the pattern, the types of purchases being made, and/or the predicted location for a subsequent fraudulent transaction. In some circumstances the likelihood of apprehension can be above a minimum requirement without an established pattern from the current card in question, but may be above the minimum requirement based on patterns of previous fraudulent transactions from previously stolen/abused cards. For example, the system may predict a likelihood of apprehension for a thief of a card based on a single current transaction and other, previous transactions which may have occurred at the same location, same time of day, purchasing the same item, paying the same amount, previously apprehended thieves who made that same transaction, etc.

Another factor which can be used by the system to decide when/if law enforcement is contacted can be the location of police officers or vehicles. For example, the system can receive current locations of police officers/vehicles through an Application Programming Interface (API) offered by a respective police department, or statistically inferred by processing police location databases (public or private). If a fraudulent transaction is identified as ongoing, the system can, for example, determine how fast the nearest police office would be able to arrive. That calculated travel time can then be used as a factor to determine if the system notifies police, delays the transaction processing, or cancel the card.

In some circumstances, such as when the system is slowing down a card transaction and at the same time requesting law enforcement, the system can have a maximum wait time, for example 120 seconds, for law enforcement to arrive before the transaction is processed. That is, delays in processing a fraudulent, or suspected fraudulent, transaction may be assigned longer (but not undetermined) processing times. If after the delay has occurred the police have not arrived at the site of the card transaction, the system can authorize the transaction. The system can then make additional determinations regarding continued monitoring, future cancellations, etc., with the added information that the fraudster waited the predetermined processing time of the transaction.

While payment card monitoring can be a constant process, systems configured herein can be configured to provide enhanced monitoring of additional transactions when a first suspicious or fraudulent transaction is detected. More specifically, the system can modify (reduce) the processing time between the transaction, the determination that the subsequent transaction is suspect, and determining if the card should be cancelled, if monitoring should continue, and/or if law enforcement should be contacted. This modification can occur, for example, by assigning a heightened priority to transactions from the card in question relative to transactions from other cards. As another example, the modification can occur by assigning additional processor resources to transactions from the card in question, or to all transactions within a geographic distance from a last suspicious transaction from the card in question.

While systems configured as disclosed herein can be of assistance in apprehending thieves and other instances of fraud, at any point when the system determines that the risk level is too high, or by extension that the likelihood of apprehension is too low or the cost for additional investigation is too high, the system can immediately begin cancelation procedures for the card. In addition, such calculations and determinations may not be tied to a given transaction. In such configurations, the risk level can be refined periodically or at predetermined intervals, such that the risk level is adjusted even if no new transactions have occurred. For example, the system may set an initial risk level after a first suspicious transaction and based on that initial risk level determine to monitor the account for a defined period of time (e.g., one month) to collect data for apprehending the fraudster. As the month progresses, each week (or each day, each hour, etc.), the system refines the risk level, and more specifically the likelihood of apprehension and the cost of continued monitoring. If no additional suspect transactions occur, the cost for continued monitoring may not increase, however the likelihood of apprehension may decrease because the system has not detected enough suspect transactions to develop a pattern. In such circumstances, the system may continue monitoring the card through the predetermined period of time, then cancel the card or otherwise engage with the cardholder to ensure the cardholder is protected, or the system may, if the likelihood of apprehension falls below a given level, cease additional monitoring and cancel the card before the predetermined period of time expires.

In some configurations, when fraud is detected with a payment card, the user of the account associated with the payment card can be notified, reimbursed, and provided a new account. However, the payment card system may make a determination to continue allowing transactions by the imposter with the intention of helping apprehend the imposter. In making the determination, the system similarly can evaluate risk level, likelihood of apprehension, cost associated with continuing to allow the transactions to occur, etc. In this manner, the system can continue to collect data needed to establish a pattern of fraudulent transactions while eliminating risk to the holder of the payment card. Furthermore, in some cases the system can create a pseudo identity and transfer the card silently from the real owner to the pseudo identity, so that the subsequent transactions are not picked up by the customer (or otherwise associated with the customer), but instead are directly paid for by the financial company backing payment card.

In addition, in some configurations the value of apprehending the thief/fraudster can be calculated using the location of a recent fraudulent transaction to a series of previously discovered fraud or stolen cases. That is, the "cost" associated with allowing the thief/fraudster may not be based entirely on the fraud being committed with the current payment card, but also with the fraud expected in future theft. For example, if the location (or IP address) of the transaction is localized (meaning it is within a predetermined distance of those previous fraudulent transactions), then the system can use the value lost in those previous instances and multiply it by a factor (e.g. 10×, signifying that we expect the same perpetrator to steal ten more cards). For example, if the thief has only used stolen cards to buy coffee three times in the past, the dollar value associated with apprehending him or her could be $5 (the cost of coffee)×3 (the number of times they previously bought coffee with a single stolen card before they stopped using it)×10 (the number of future instances of theft predicted from this thief)=$150. Another thief might have stolen two cards in the past, but that thief has an average expense of $5000 each time, so the value of apprehending him or her is $5000 (cost of individual fraudulent transactions)×10 (predicted number of future instances of theft)=$50,000. This calculation regarding the particular value of capturing a particular thief can also be used in the risk calculation.

Figure 1:
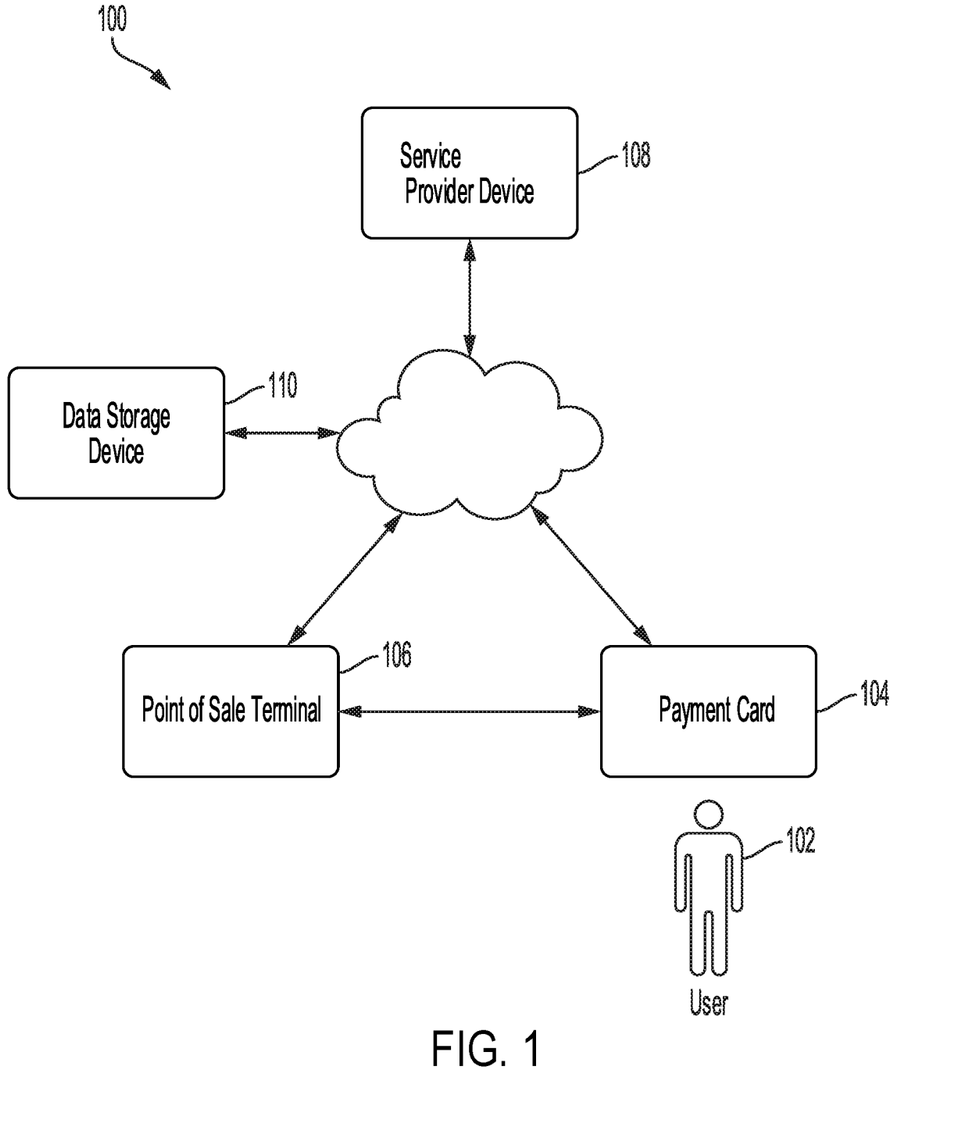
FIG. 1 illustrates an example system embodiment.

FIG. 1 illustrates an example system embodiment 100. In this example 100, a user 102 uses their payment card 104, either at a point of sale terminal 106 or directly over a network, such as the Internet, to communicate with a service provider device 108, such as a server configured to approve transactions. The service provider device 108 can, in determining if a transaction is suspicious (that is, not from the user 102, but from an imposter using the payment card 104 without permission) by accessing a data storage device 110. The data storage device 110 can, for example, store previous transactions of the user, previous fraudulent transactions, non-fraudulent transactions of other users, etc.

As disclosed herein, the service provider device 108 can then monitor point of sale terminals 106 for additional transactions associated with the payment card 104 to determine if there is a pattern in frequency, location, purchases, etc., by which the potential imposter/thief/fraudster can be identified and apprehended. If so, the service provider device 108 can continue monitoring until a pattern is predicted with a predetermined level of confidence, at which point the service provider device 108 can alert authorities to the pattern. If, once the pattern of illegitimate transactions is detected, the service provider device 108 detects an additional, ongoing illegitimate transaction (or other transaction fitting the detected pattern of suspicious transactions), the service provider device 108 can slow down the processing time of the payment card 104 at the point of sale terminal 106 and alert law enforcement authorities regarding the location of the point of sale terminal 106. For example, the service provider device 108 can send a notification to authorities indicating "an imposter is attempting to use a stolen credit card (or other card type) at the gas station at Franklin and Main," while simultaneously delaying the imposter's transaction, thereby allowing time for law enforcement to arrive.

Figure 2:
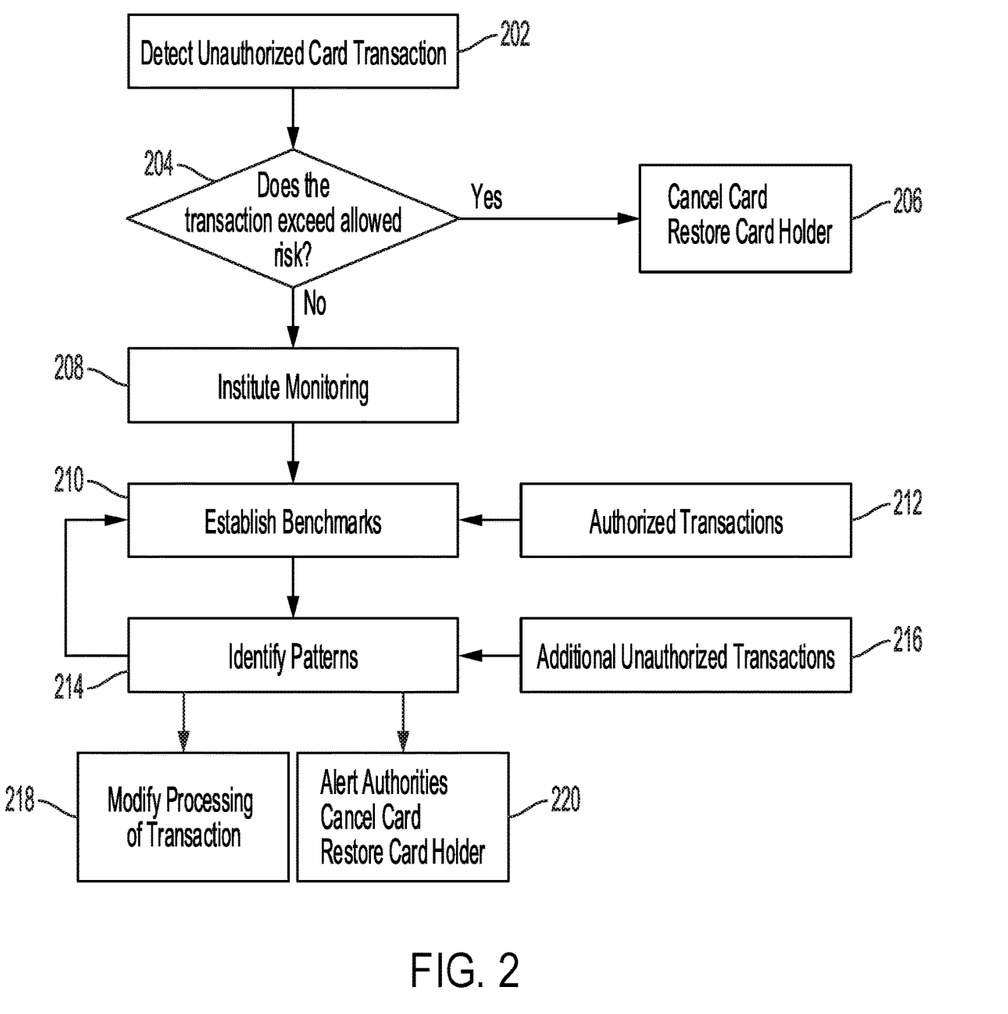
FIG. 2 illustrates an example algorithm.

FIG. 2 illustrates an example algorithm. In this example, the system (such as a server), detects an unauthorized card transaction (202). Detection of an unauthorized card transaction (202), or otherwise suspicious card transaction, can occur using any known method. In this example, the system determines if the unauthorized transaction exceeds an allowed risk (204). If so, the system cancels the card and restores the card holder (206) (reimbursing the account, issuing a new card, etc.). If the unauthorized transaction does not exceed the allowed risk, the system can institute enhanced monitoring (208) of transactions associated with the card, in a specific geographic area, etc. The system can then establish benchmarks (210) based on previously authorized transactions (212) and identify patterns (214) based on the unauthorized card transaction and additional unauthorized transactions (216). The process of identifying benchmarks (210) and identifying patterns (214) can continue until a confidence of apprehension is reached or until the level of risk in continuing to allow the unauthorized transactions to continue exceeds a baseline amount. Once a pattern is detected, and the system detects another (ongoing) fraudulent transaction, the system can modify processing of the transaction (218) while alerting authorities, at which point the system can also cancel the card and restore the card holder (220).

Figure 3:
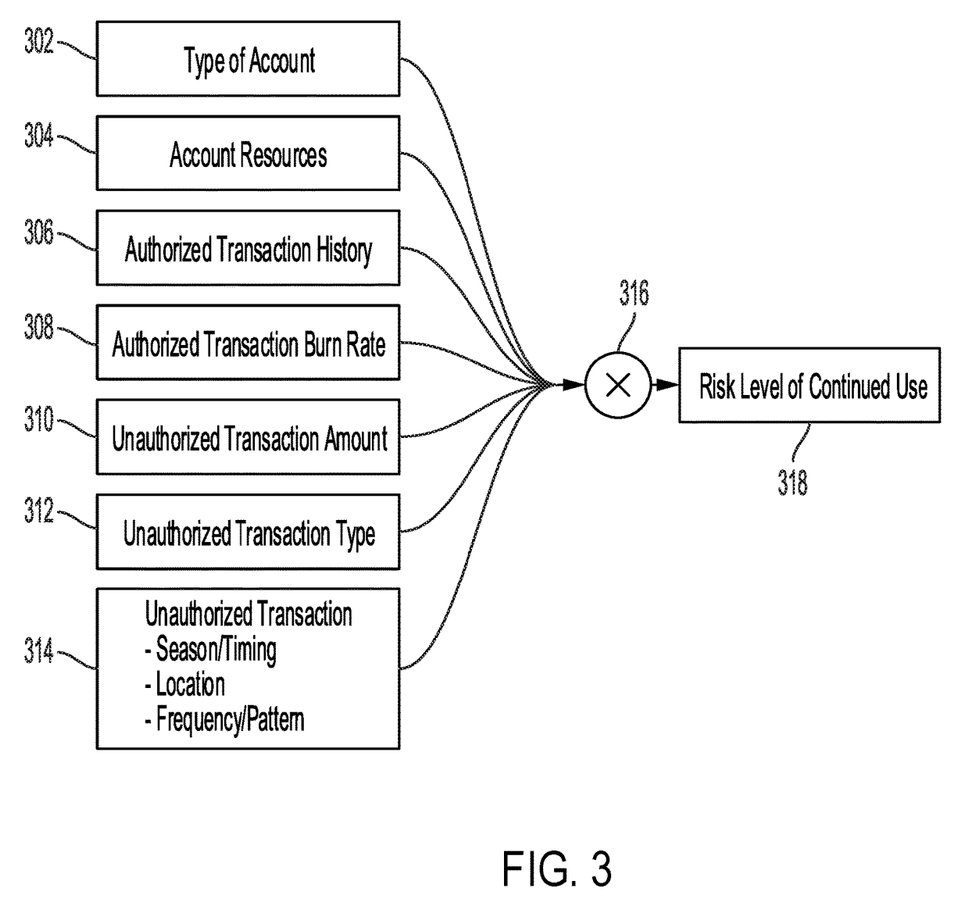
FIG. 3 illustrates exemplary inputs to determine a risk level of allowing a compromised card to continue to be used.

FIG. 3 illustrates exemplary inputs to determine a risk level of allowing a potentially compromised card to continue to be used. Exemplary inputs can include:

A type of account 302. For example, debit cards may be tied to a bank account, whereas credit cards may be tied to a credit account. Gift cards may be tied to an account associated with the specific amount deposited at time of purchase.

Account resources 304. For example, a bank account may have finite resources available, and may also have planned, periodic withdrawals which, if continued with the fraud, could result in the account having insufficient funds. Likewise, a credit card account may be in danger of hitting the credit limit if normal transactions and fraudulent transactions both continue.

Authorized transaction history 306. This information can be used to set a baseline range of approved transactions. For example, in some configurations, this baseline range can be a bell curve identifying different transaction amounts and the frequency of occurrence of those transaction amounts. The bell curve can likewise be divided into regions based on the standard deviation of respective transaction amounts. In other configurations, the baseline can be an average. The authorized transaction history can also assist in identifying suspicious or fraudulent transactions, locations of card use, times of usage, etc.

Authorized transaction burn rate 308. This refers to the rate at which the authorized user of the payment card spends money using the card. In some configurations this can be obtained using the authorized transaction history 306, whereas in other configurations the authorized transaction burn rate 308 can be obtained from the service provider of the card.

Unauthorized transaction amount 310. The unauthorized transaction amount 310 can be for a single transaction, or can refer to the respective amounts associated with a pattern or history of unauthorized transactions. These unauthorized transactions can be for a single payment card, and/or can be historical data from additional cards. For example, the unauthorized transaction amount 310 can be the one or more unauthorized transactions for a given payment card as well as previous unauthorized transactions which have occurred within a given geographic area (i.e., neighborhood, radius of the current unauthorized transaction, zip code, etc.) within a given time period (the past year, the past week, etc.). In some cases, these past transactions can also be based on the time of day of the current and previous unauthorized transactions. For example, if the current unauthorized transaction occurred at 4 p.m., the past transactions might be unauthorized transactions which occurred within a geographic distance of the current unauthorized transaction between 3 p.m. and 5 p.m. over the past month.

Unauthorized transaction type 312. This can refer to the type of payment card used: credit, debit, or gift card. This can also refer to the type of purchase being made. For example, if the unauthorized transaction occurring at a grocery store or restaurant, the transaction is likely food. If occurring at a gas pump, the transaction is likely gas. If occurring inside a gas station, the purchase is likely food or tobacco.

Unauthorized transaction season/timing, location, frequency/pattern 314. This can refer to when, where, and how often the payment card is being used without authorization, and can be used by the system to predict where and when the imposter will be located. This prediction can be provided to law enforcement, allowing them to be nearby when a subsequent transaction occurs.

All or a portion of the respective factors 302, 304, 306, 308, 310, 312, 314 can be combined, weighted, or otherwise used 316 to develop a risk level of continued use 318 of the payment card after detecting one or more unauthorized transactions. This risk level can represent the risk to the authorized user of the card and/or the risk to the financial institution backing the card.

Figure 4:
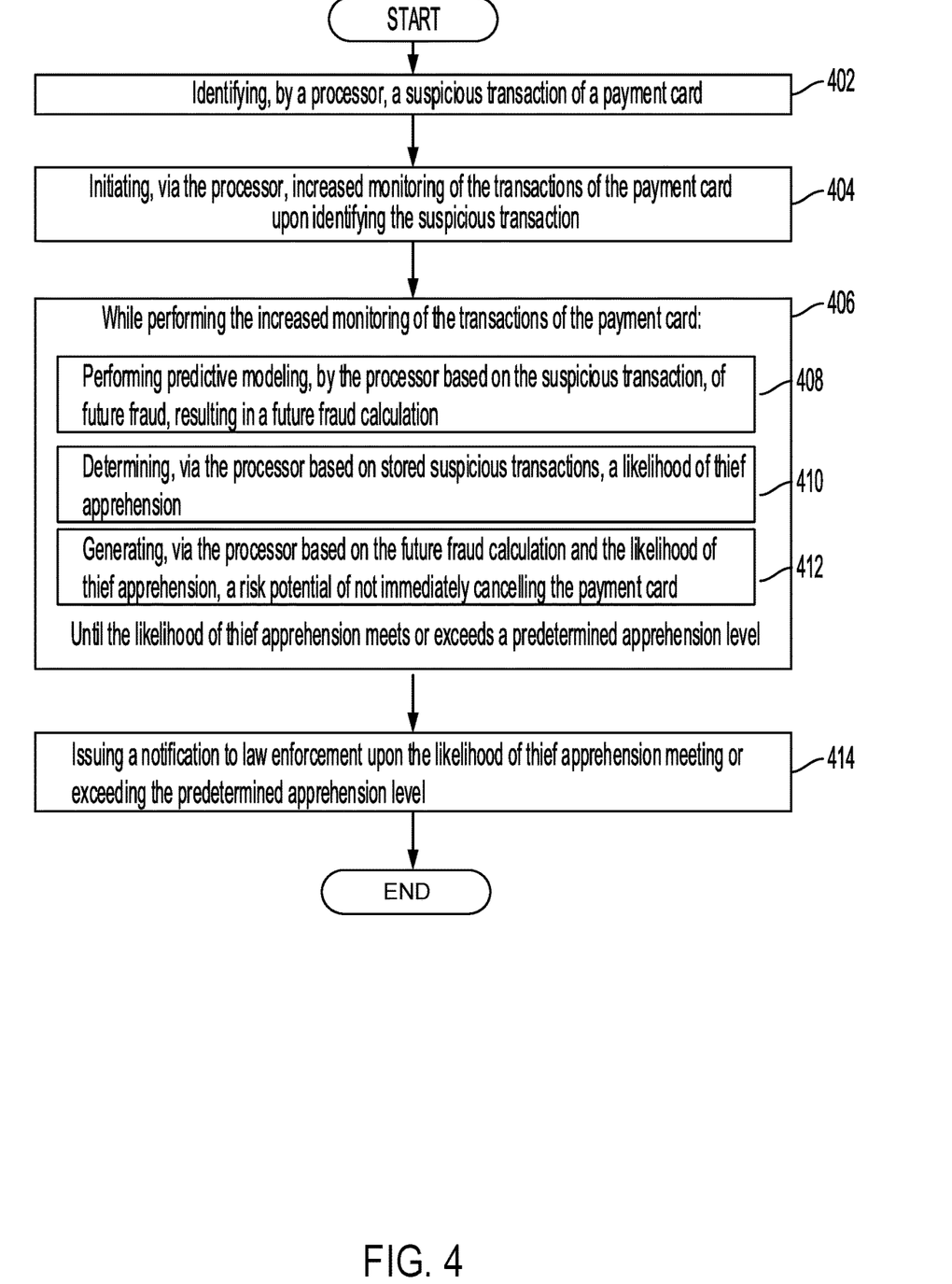
FIG. 4 illustrates an example method embodiment.

FIG. 4 illustrates an example method embodiment. As illustrated, the method implemented by a system (such as a server or computing system specifically configured to interact with payment card transactions) can include identifying, by a processor, a suspicious transaction of a payment card (402). The processor can initiate increased monitoring of the transactions of the payment card upon identifying the suspicious transaction (404) and, while performing the increased monitoring of the transactions of the payment card (406): performing predictive modeling, by the processor based on the suspicious transaction, of future fraud, resulting in a future fraud calculation (408); determining, via the processor based on stored suspicious transactions, a likelihood of thief apprehension (410); and generating, via the processor based on the future fraud calculation and the likelihood of thief apprehension, and a risk potential of not immediately cancelling the payment card (412), until the likelihood of thief apprehension meets or exceeds a predetermined apprehension level. The system can then issue a notification to law enforcement upon the likelihood of thief apprehension meeting or exceeding the predetermined apprehension level (414).

In some configurations, the risk potential can be further based on non-suspicious transactions associated with the payment card, and the non-suspicious transactions associated with the payment card can include transaction amounts, locations of transactions, and a deviation from a transaction amount by the suspicious transaction.

In some configurations, the illustrated method can be augmented to further include delaying, via the processor, processing of an ongoing transaction of the payment card at a location.

Examples of the card type include one or more of a credit card, a debit card, and a gift card.

In some configurations, the risk potential can be further based on one or more of: a frequency of transactions occurring at a location; a time pattern of transactions occurring at the location; and amount trends of suspicious transactions and non-suspicious transactions.

In some configurations, the method can further include retrieving, from a database, a transaction history of authorized use of the payment card and retrieving, from the database, a plurality of previously identified fraudulent transactions. In such configurations, the method can then further include analyzing the transaction history to determine a bell curve of authorized amounts based on the transaction history and analyzing the previously identified fraudulent transactions to determine a bell curve of fraudulent amounts. The risk potential can then be further based on the bell curve of authorized amounts and the bell curve of fraudulent amounts.

Figure 5:
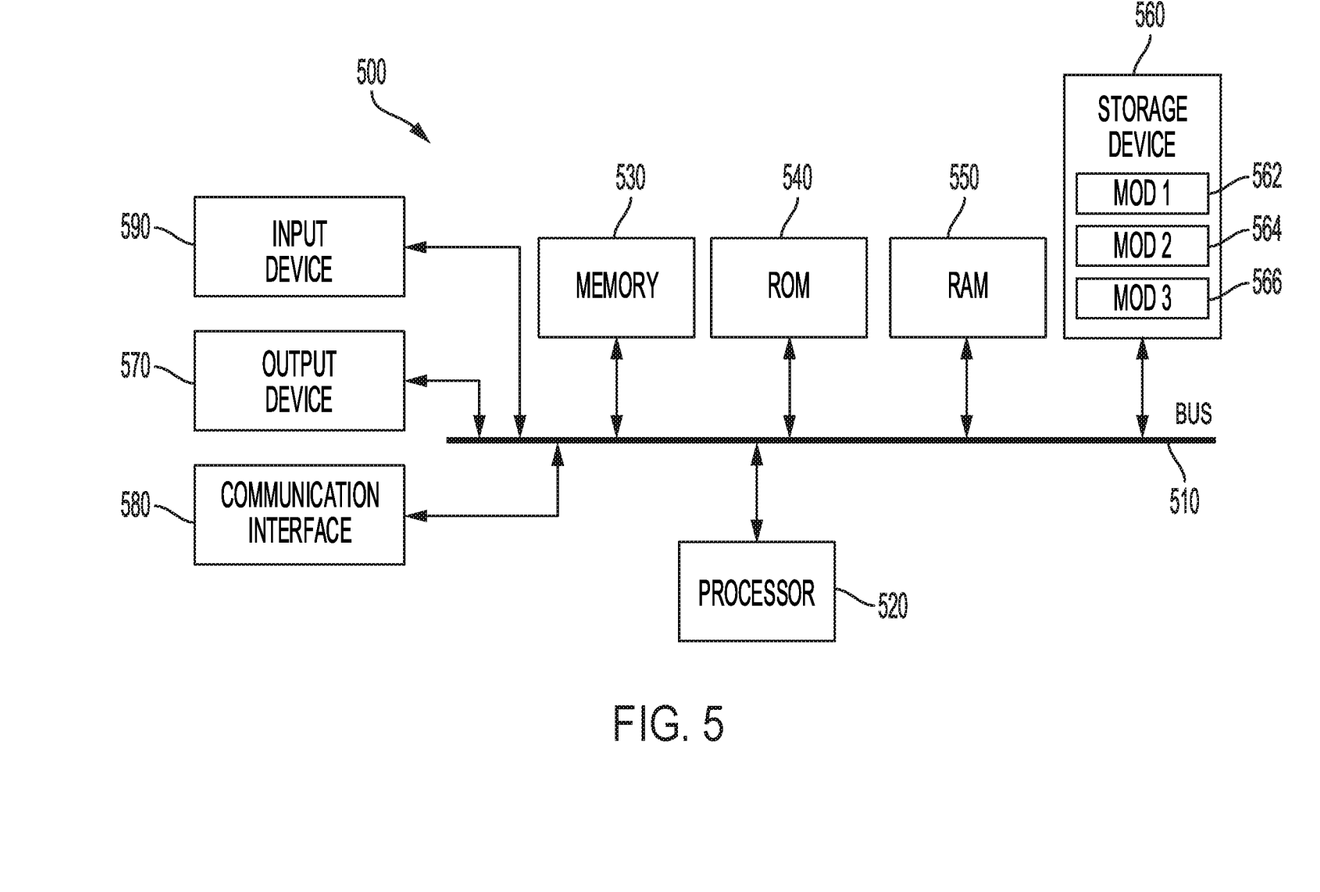
FIG. 5 illustrates an example computer system.

With reference to FIG. 5, an exemplary system includes a general-purpose computing device 500, including a processing unit (CPU or processor) 520 and a system bus 510 that couples various system components including the system memory 530 such as read-only memory (ROM) 540 and random access memory (RAM) 550 to the processor 520. The system 500 can include a cache of high-speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, bus 510, display 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, and read-only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method, comprising:
    retrieving from a database, via a processor:
        a transaction history of authorized use of a payment card;
        inputs indicating likelihood of thief apprehension that include collected evidence, stored suspicious transactions revealing a pattern or location associated with fraud events, and location of police officers;
    training, via the processor, a model using the transaction history and inputs indicating likelihood of thief apprehension, resulting in a trained model;
    identifying, by the processor, a suspicious transaction of the payment card;
    initiating, via the processor, increased monitoring of transactions of the payment card upon identifying the suspicious transaction;
    while performing the increased monitoring of the transactions of the payment card:
        performing, via the processor, predictive modeling using the trained model to determine a predicted transaction amount for future transactions;
        determining, via the processor, a likelihood of thief apprehension; and
        determining, via the processor, based on the predicted transaction amount and the likelihood of thief apprehension, a weighted risk level of not immediately cancelling the payment card,
            until the likelihood of thief apprehension meets or exceeds a predetermined apprehension level; and
        issuing a notification to law enforcement upon the likelihood of thief apprehension meeting or exceeding the predetermined apprehension level.

2. The method of claim 1, wherein the weighted risk level is further based on non-suspicious transactions associated with the payment card.

3. The method of claim 2, wherein the non-suspicious transactions associated with the payment card comprise transaction amounts, locations of transactions, and a deviation from a transaction amount by the suspicious transaction.

4. The method of claim 1, further comprising:
    delaying, via the processor, processing of an ongoing transaction of the payment card at a location.

5. The method of claim 1, wherein the payment card is one of a credit card, a debit card, and a gift card.

6. The method of claim 1, wherein the weighted risk level is further based on one or more of:
    a frequency of transactions occurring at a location;
    a time pattern of transactions occurring at the location; and amount trends of suspicious transactions and non-suspicious transactions.

7. The method of claim 1, further comprising:
retrieving, from a database, a transaction history of authorized use of the payment card; and
retrieving, from the database, a plurality of previously identified fraudulent transactions.

8. The method of claim 7, further comprising analyzing the transaction history to determine a bell curve of authorized amounts based on the transaction history.

9. The method of claim 8, further comprising analyzing the previously identified fraudulent transactions to determine a bell curve of fraudulent amounts.

10. The method of claim 9, wherein the weighted risk level is further based on the bell curve of authorized amounts and the bell curve of fraudulent amounts.

11. A system comprising:
a processor; and
a non-transitory computer-readable storage medium having instructions stored which, when executed by the processor, cause the processor to perform operations comprising:
retrieving:
authorized transactions associated with a payment card;
inputs indicating likelihood of thief apprehension that include collected evidence, stored suspicious transactions revealing a pattern or location associated with fraud events, and location of police officers;
training a model using the authorized transactions and inputs indicating likelihood of thief apprehension, resulting in a trained model;
identifying a suspicious transaction of the payment card;
after identifying the suspicious transaction, increasing monitoring of transactions of the payment card;
while performing the increased monitoring of the transactions of the payment card:
predicting, using the trained model, a predicted transaction amount for future authorized transactions;
determining, using the trained model, a likelihood of thief apprehension; and
determining, via the processor, based on the predicted transaction amount and the likelihood of thief apprehension, a weighted risk level of not immediately cancelling the payment card,
until the likelihood of thief apprehension meets or exceeds a predetermined apprehension level; and
notifying law enforcement upon the likelihood of thief apprehension meeting or exceeding the predetermined apprehension level.

12. The system of claim 11, wherein the weighted risk level is further based on the authorized transactions associated with the payment card.

13. The system of claim 12, wherein the authorized transactions associated with the payment card comprise transaction amounts and locations of transactions.

14. The system of claim 11, the non-transitory computer-readable storage medium having additional instructions stored which, when executed by the processor, cause the processor to perform operations comprising:
delaying processing of an ongoing transaction of the payment card at a location.

15. The system of claim 11, wherein the payment card is one of a credit card and a debit card.

16. The system of claim 11, wherein the weighted risk level is further based on one or more of:
a frequency of transactions occurring at a location where the suspicious transaction occurred;
a time pattern of transactions occurring at the location; and
amount trends of suspicious transactions at the location.

17. The system of claim 11, wherein the likelihood of thief apprehension is further based on a location where the suspicious transaction occurred.

18. The system of claim 17, the non-transitory computer-readable storage medium having additional instructions stored which, when executed by the processor, cause the processor to perform operations comprising:
analyzing the authorized transactions to determine a bell curve of authorized amounts.

19. The system of claim 18, wherein the weighted risk level is further based on the bell curve of authorized amounts.

20. A non-transitory computer-readable storage medium having instructions stored which, when executed by a computing device, cause the computing device to perform operations comprising:
retrieving:
authorized transactions associated with a payment card;
inputs indicating likelihood of thief apprehension that include collected evidence, stored suspicious transactions revealing a pattern or location associated with fraud events, and location of police officers;
training a model using the authorized transactions and inputs indicating likelihood of thief apprehension, resulting in a trained model;
identifying a suspicious transaction of the payment card;
after identifying the suspicious transaction, increasing monitoring of transactions of the payment card;
while performing the increased monitoring of the transactions of the payment card:
predicting, using the trained model, a predicted transaction amount for future authorized transactions;
determining, using the trained model, a likelihood of thief apprehension; and
determining, via the processor, based on the predicted transaction amount and the likelihood of thief apprehension, a weighted risk level of not immediately cancelling the payment card,
until the likelihood of thief apprehension meets or exceeds a predetermined apprehension level; and
notifying law enforcement upon the likelihood of thief apprehension meeting or exceeding the predetermined apprehension level.

* * * * *